No. 880,445. PATENTED FEB. 25, 1908.
J. S. DONNELLY & J. FREDERICK.
LAND ROLLING AND PULVERIZING MACHINE.
APPLICATION FILED FEB. 2, 1907.
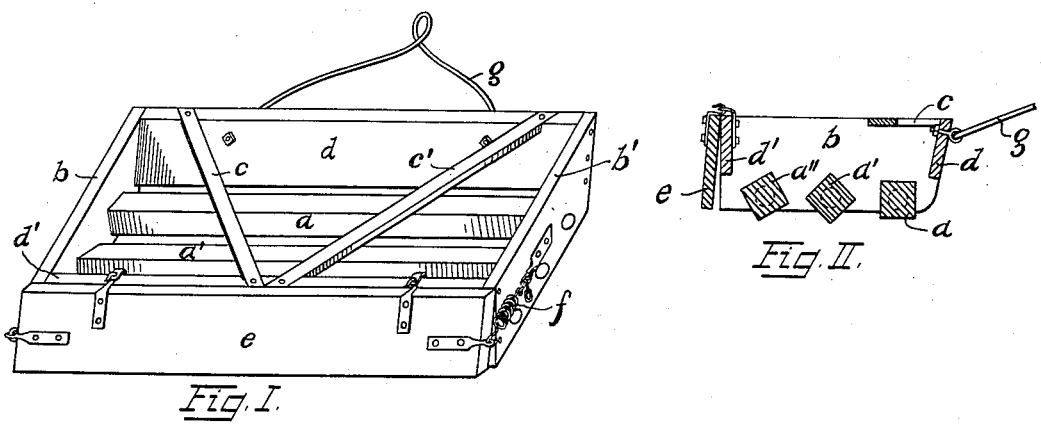
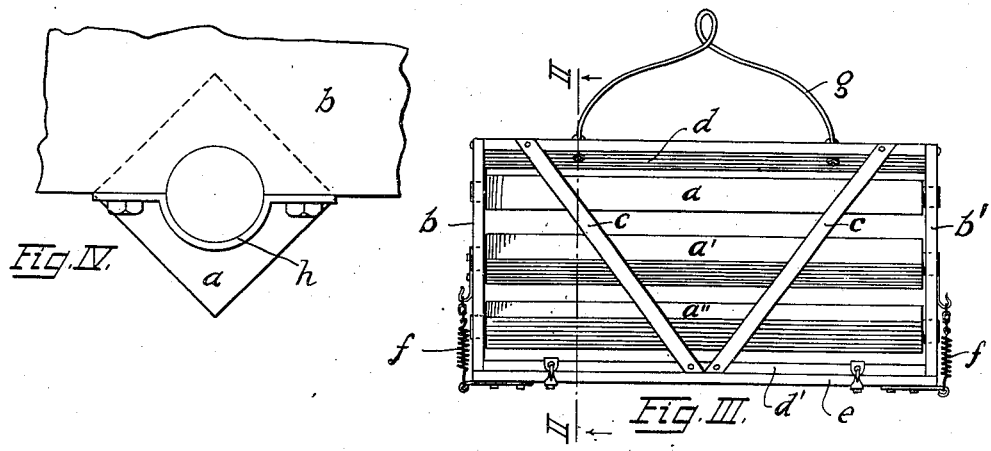
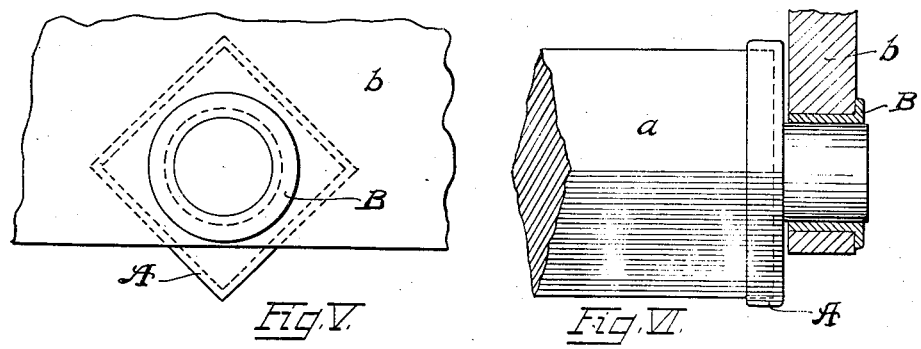
Witnesses:
F. C. Valentine
J. M. Chatfield
Inventors,
Jason S. Donnelly
John Frederick
By Frank E. Bennett
Att'y

UNITED STATES PATENT OFFICE.

JASON S. DONNELLY, OF SHARON, AND JOHN FREDERICK, OF COPLEY, OHIO, ASSIGNORS, BY DIRECT AND MESNE ASSIGNMENTS, OF ONE-HALF TO SAID DONNELLY AND ONE-HALF TO M. D. KILMER, OF CLEVELAND, OHIO.

LAND ROLLING AND PULVERIZING MACHINE.

No. 880,445.  Specification of Letters Patent.  Patented Feb. 25, 1908.

Application filed February 2, 1907. Serial No. 355,522.

*To all whom it may concern:*

Be it known that we, JASON S. DONNELLY, a citizen of the United States, residing at Sharon, in the county of Summit and State of Ohio, and JOHN FREDERICK, a citizen of the United States, residing at Copley, in the county of Summit and State of Ohio, have jointly invented a new and useful Improvement in Land Rollers and Pulverizers, of which the following is a specification.

Our invention relates to combined rollers and pulverizers and has for its object the production of a roller and pulverizer of this type which will effectively crush the clods and compact the ground while leaving the surface of the ground in a particularly fine condition for seeding.

A further object of the invention is to provide a roller of this type which shall combine simplicity and cheapness of construction with extreme efficiency of operation. We attain these objects by the mechanism illustrated in the accompanying drawings, forming a part hereof, wherein Figure 1 represents a perspective view of our combined roller and pulverizer; Fig. 2 represents a sectional view taken on the line 2—2 of Fig. 3; Fig. 3 represents a plan view of the roller and pulverizer shown in Fig. 1;
Figs. 4 and 5 represent details in elevation of modified forms of bearings for the roller bars, and Fig. 6 represents a detail, partly in section and partly in elevation, of the bar and bearing shown in Fig. 5.

Describing the parts by reference characters, $a$, $a'$, $a''$ represent the rollers, which are composed of bars, preferably of wood, which are angular in section, being represented as square. These rollers are of small diameter (preferably about 4 inches) and are provided with rounded ends which are journaled in the side frames $b$, $b'$. The side frames are connected to the end frames $d$, $d'$, inclined braces $c$, $c'$ being also employed to connect and brace said end frames. To the rear frame $d$, there is hinged a smoothing board $e$, the lower edge of which is adapted to smooth the surface of the ground which has been acted upon by the bars $a$, $a'$, $a''$. Spiral springs $f$ are provided for said smoothing board, being connected to the opposite ends thereof and adjustably connected to the side frames $b$, $b'$. The front end frame $d$ has pivotally secured thereto a draft attachment $g$, shown as a bail.

The ends of the roller bars may be mounted in the side frames in any suitable manner. In Fig. 4, they are shown as journaled in recesses formed in the bottoms of the side frames, being retained in said recesses by removable journal caps $h$. In Fig. 5, the rounded ends of the rollers are mounted in metallic bushings B inserted in the side frames above the bottoms thereof, and the bars may be provided at their ends with metallic caps A secured thereto in any suitable manner.

In operation, as the bars rotate in their journals in the side frames, the sharp angles thereon split and crush the clods, while the weight of the roller frame and its parts compacts the soil for a considerable depth. The sharp angles of the bars leave the surface of the field in an infinite number of small ridges of loose earth, due to the lifting effect of the sharp angles as they leave the ground. As the sharp angles leave the ground, they stir the surface soil, owing to the backward lift given to the earth, and, while the soil as a whole is compacted to a considerable depth, as is the case with the ordinary roller, the lifting and stirring action of these sharp corners leaves the surface of the earth in a pulverized condition and in especially fine condition for seeding. The smoothing board levels the small ridges formed between indentations without compacting the surface.

We are aware of the fact that it has been proposed to use large rollers having obtuse corners, but these will not work the surface of the soil in the manner that the sharp-angled corners will do, the obtuse-angled bars presenting to the ground a shoulder which bears the roller up and which has little wedging or spliting action on the clods and none of the stirring effect as the angular corner turns back and up. Furthermore, owing to the large size of such rollers, there is no rapid striking movement of the edges as they come down, as is the case with our small bars. We are also aware of the fact that it has been proposed to mount harrow teeth in revolving angular bars, but these bars are incapable of producing the rolling, pulverizing, and stirring action of our bars. The fact that they are provided with teeth will prevent the bars from coming into actual contact with the surface of the soil, and while the angles may split a few of the largest clods, the bars will not crush and pulverize the same and will not exercise the rolling effect on the ground with the subsequent stirring action. We are also aware of the fact that it has been proposed to utilize bars which, though having angles of approximately 90°, have broken surfaces. These prevent the bars from acting as rollers, and, in the constructions employing such bars, it has been found necessary to use a roller to follow up the bars. This leaves the surface of the ground in the same condition as that due to the action of an ordinary roller, with none of the stirring action due to the sharp corners.

To obtain the best results, the angles between adjacent faces of the bars should not exceed 90°. Important advantages of using bars of small diameter are the lightening of the draft due to the reduced weight of the roller as a whole and the feasibility of using but a small number of such bars. It has been found that three bars of small diameter will compact the earth, and will thoroughly and effectively stir the surface thereof for seeding.

What we claim as our invention and desire to secure by Letters Patent is—

1. A land roller and pulverizer comprising a pair of side frames and rollers journaled therein and adapted to support the weight of said frames, each of said rollers consisting of an angular bar of small diameter and unbroken exterior, the angles of said bar not exceeding 90° in extent, substantially as specified.

2. A land roller comprising a pair of side frames and a rear frame, rollers journaled in said side frames and adapted to support the weight of said frames, each of said rollers consisting of an angular bar of small diameter and unbroken exterior, the angles of said bar not exceeding 90° in extent, and a smoothing board carried by said rear frame, substantially as specified.

3. A land roller and pulverizer comprising a pair of side frames and rollers supported thereby and adapted to support the weight of said frames, each of said rollers consisting of an angular bar of unbroken exterior, the angles of said bar not exceeding 90° in extent, substantially as specified.

In testimony whereof we have signed our names to this specification in the presence of two subscribing witnesses.

JASON S. DONNELLY.
JOHN FREDERICK.

Witnesses:
LOUISA FREDERICK,
J. M. CHATFIELD.